(12) United States Patent
Jin et al.

(10) Patent No.: US 8,442,360 B2
(45) Date of Patent: May 14, 2013

(54) INTRINSICALLY LOW RESISTIVITY HYBRID SOL-GEL POLYMER CLADS AND ELECTRO-OPTIC DEVICES MADE THEREFROM

(75) Inventors: Danliang Jin, Bothell, WA (US); Guomin Yu, Bothell, WA (US); Anna Barklund, Kirkland, WA (US); Hui Chen, Kirkland, WA (US)

(73) Assignee: GigOptix, Inc., San Jose, CA (US)

( * ) Notice: Subject to any disclaimer, the term of this patent is extended or adjusted under 35 U.S.C. 154(b) by 576 days.

(21) Appl. No.: 12/612,540

(22) Filed: Nov. 4, 2009

(65) Prior Publication Data
US 2010/0111465 A1 May 6, 2010

Related U.S. Application Data

(60) Provisional application No. 61/111,661, filed on Nov. 5, 2008.

(51) Int. Cl.
*G02F 1/035* (2006.01)

(52) U.S. Cl.
USPC ........................................................... 385/2

(58) Field of Classification Search ........................ None
See application file for complete search history.

(56) References Cited

U.S. PATENT DOCUMENTS

| | | | |
|---|---|---|---|
| 4,749,245 A | 6/1988 | Kawatsuki et al. | |
| 5,120,339 A | 6/1992 | Markovich et al. | |
| 5,170,461 A | 12/1992 | Yoon et al. | |
| 5,198,513 A | 3/1993 | Clement et al. | |
| 5,219,788 A | 6/1993 | Abernathey et al. | |
| 5,223,356 A | 6/1993 | Kumar et al. | |
| 5,265,185 A | 11/1993 | Ashley | |
| 5,370,969 A | 12/1994 | Vidusek | |

(Continued)

FOREIGN PATENT DOCUMENTS

| | | |
|---|---|---|
| JP | 4238305 | 8/1992 |
| JP | 9258151 | 10/1997 |

(Continued)

OTHER PUBLICATIONS

James G. Grote et al. "Advancements in conductive cladding materials for nonlinear optic polymer based optoelectronic devices." Photonic Devices and Algorithms for Computing III, Khan M. Iftekharuddin, Abdul Ahad S. Awwal, Editors, Proceedings of SPIE vol. 4470 (2001).

(Continued)

*Primary Examiner* — Sung Pak
(74) *Attorney, Agent, or Firm* — Launchpad IP, Inc.; Christopher A. Wiklof

(57) ABSTRACT

A low resistivity hybrid organic-inorganic material may include a proportion of charge traps including a trap element indirectly covalently bonded to a donor or acceptor element. The trap element may include tin. The donor or acceptor element may include indium and/or antimony. Bonding includes cross-linking via oxygen bonds and via organic cross-linkers. The material may be formed as a hybrid sol-gel. The material may have optical transmission and refractive index characteristics. The material may be formed as optical cladding proximal to a non-linear optical layer, and may form a portion of a second order nonlinear optical device. The second order nonlinear optical device may include and electro-optic device including an organic chromophore-loaded modulation layer.

55 Claims, 10 Drawing Sheets

U.S. PATENT DOCUMENTS

| | | | |
|---|---|---|---|
| 5,433,895 | A | 7/1995 | Jeng et al. |
| 5,480,687 | A | 1/1996 | Heming et al. |
| 5,497,445 | A | 3/1996 | Imoto |
| 5,635,576 | A | 6/1997 | Foll et al. |
| 5,714,304 | A | 2/1998 | Gibbons et al. |
| 5,776,374 | A | 7/1998 | Newsham et al. |
| 5,783,319 | A | 7/1998 | Reisfeld et al. |
| 5,811,507 | A | 9/1998 | Chan et al. |
| 5,861,976 | A | 1/1999 | Hoekstra |
| 5,887,116 | A | 3/1999 | Grote |
| 6,002,828 | A | 12/1999 | Hult et al. |
| 6,019,906 | A | 2/2000 | Jang et al. |
| 6,022,671 | A | 2/2000 | Binkley et al. |
| 6,031,945 | A | 2/2000 | You et al. |
| 6,126,867 | A | 10/2000 | Kanitz et al. |
| 6,144,779 | A | 11/2000 | Binkley et al. |
| 6,229,949 | B1 | 5/2001 | Ido et al. |
| 6,294,573 | B1 | 9/2001 | Curtin et al. |
| 6,303,730 | B1 | 10/2001 | Fries et al. |
| 6,306,563 | B1 | 10/2001 | Xu et al. |
| 6,323,361 | B1 | 11/2001 | Wu et al. |
| 6,335,149 | B1 | 1/2002 | Xu et al. |
| 6,385,355 | B1 | 5/2002 | Nashimoto et al. |
| 6,419,989 | B1 | 7/2002 | Betz et al. |
| 6,466,707 | B1 | 10/2002 | Dawes et al. |
| 6,473,551 | B2 | 10/2002 | Norwood et al. |
| 6,621,951 | B1 | 9/2003 | Zhao et al. |
| 6,724,968 | B2 | 4/2004 | Lackritz et al. |
| 6,937,811 | B2 | 8/2005 | Bintz et al. |
| 6,946,238 | B2 | 9/2005 | Zhang et al. |
| 7,039,289 | B1 | 5/2006 | Mendoza et al. |
| 7,206,490 | B2 | 4/2007 | Bintz et al. |
| 7,796,855 | B2 * | 9/2010 | Zheng et al. ............ 385/129 |
| 7,813,615 | B2 * | 10/2010 | Bae et al. ............ 385/143 |
| 2001/0041025 | A1 | 11/2001 | Farahi |
| 2003/0077456 | A1 | 4/2003 | Atkins et al. |
| 2006/0275615 | A1 * | 12/2006 | Kuramoto et al. ........... 428/447 |
| 2009/0052856 | A1 * | 2/2009 | Bae et al. ............ 385/131 |
| 2010/0040322 | A1 * | 2/2010 | Li et al. ............ 385/3 |
| 2010/0074584 | A1 * | 3/2010 | Jin et al. ............ 385/123 |
| 2010/0121016 | A1 * | 5/2010 | Jin et al. ............ 528/30 |
| 2012/0163749 | A1 * | 6/2012 | Huang et al. ............ 385/3 |

FOREIGN PATENT DOCUMENTS

| | | |
|---|---|---|
| JP | 10048443 | 2/1998 |
| JP | 10232323 | 9/1998 |
| JP | 2001235640 | 8/2001 |
| JP | 2001255426 | 9/2001 |

OTHER PUBLICATIONS

C. Terrier et al. "Analysis of Antimony Doping in Tin Oxide Thin Films Obtained by the Sol-Gel Method." Journal of Sol-Gel Science and Technology 10, 75-81 (1997). Kluwer Academic Publishers, The Netherlands.

Paul R. Ashley et al. "Doped Optical Claddings for Waveguide Devices with Electrooptical Polymers." IEEE Photonics Technology Letters, vol. 4 No. 9 (Sep. 1992). pp. 1026-1028.

James G. Grote et al. "Effect of Conductivity and Dielectric Constant on the Modulation Voltage for Optoelectronic Devices Based on Nonlinear Optical Polymers." Opt. Eng. 40(11), Society of Photo-Optical Instrumentation Engineers, (Nov. 2001). pp. 2464-2473.

Xiaoping Cao et al. "Influences of Dopants on the Electronic Structure of SnO2 Thin Films." Thin Solid Films (1998). Department of Chemistry, Tsinghua Univeristy, Beijing, China. pp. 443-445.

B. Stjema et al. "Optical and Electrical Properties of Radio Frequency Sputtered Tin Oxide Films DFOped with Oxygen Vacancies, F, Sb or Mo." (Sep. 1994). American Institute of Physics. pp. 3797-3817.

T. Kololuoma et al. "Transparent Conductive Sol-Gel Thin Films for Photonic Applications." University of Oulu, Department of Chemistry, Oulu, Finland. (Jan. 1999). pp. 134-142.

Bailey et al. "Step and Flash Imprint Lithography: Template Surface Treatment and Defect Analysis." J. Vac. Sci. Technol. B, 2000, 18(6): 3572-3577.

James G. Grote et al. "Conductive Cladding Layers for Electrode Poled Nonlinear Optic Polymer Electro-optics." Proceeding of SPIE vol. 4114 (2000). pp. 101-109.

Leovich et al. "Optimized Cladding Materials for Nonlinear Optic Polymer Based Devices." Proceedings of SPIE vol. 4652 (2002). pp. 97-103.

Chen et al. "Thermosetting Polyurethanes with Stable and Large Second-Order Optical Nonlinearity." Macromolecules, 1992, 25: 4032-4035.

Ma et al. "A Novel Class of High-Performance Perfluorocyclobutane-Containing Polymers for Second-Order Nonlinear Optics." Chem. Mater.., 2000, 12: 1187-1189.

Ma et al. "Highly Efficient and Thermally Stable Nonlinear Optical Dendrimer for Electrooptics." J. Am. Chem. Soc., 2001, 123: 986-987.

Mao et al. "Progress toward Device-Quality Second-Order Nonlinear Optical Materials. I. Influence of Composition and Processing Conditions on Nonlinearity, Temporal Stability, and Optical Loss." Chem. Mater. 1998, 10: 146-155.

Oh et al. "Electroo-optic Polymer Modulators for 1.55 um wavelength using phenyltetraene Bridged Chromophore in Polycarbonate." Appl. Phys. Lett., 2000, 76(24): 3525-3527.

Resnick et al. "Release Layers for Contact and Imprint Lithography." Semicon. Int., Jun. 2002, online version, 7 pages.

* cited by examiner

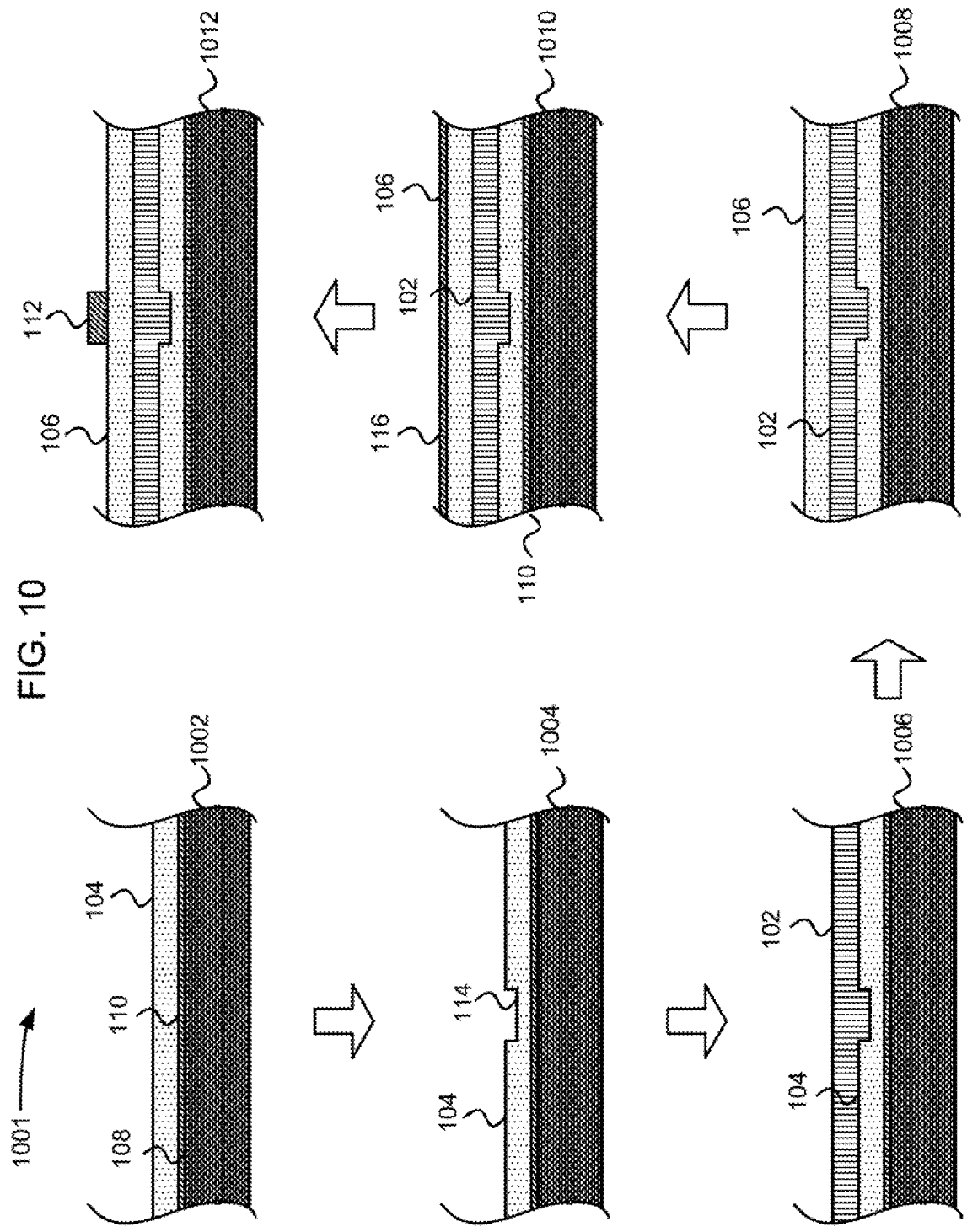

US 8,442,360 B2

INTRINSICALLY LOW RESISTIVITY HYBRID SOL-GEL POLYMER CLADS AND ELECTRO-OPTIC DEVICES MADE THEREFROM

CROSS-REFERENCE TO RELATED APPLICATIONS

This application claims priority benefit under 35 U.S.C. §119(e) from, and to the extent not inconsistent with this application, incorporates by reference herein U.S. Provisional Patent Application Ser. No. 61/111,661; filed Nov. 5, 2008; entitled "INTRINSICALLY LOW RESISTIVITY HYBRID SOL-GEL POLYMER CLADS AND ELECTRO-OPTIC DEVICES MADE THEREFROM"; invented by Danliang Jin, Guomin Yu, Anna Barklund, and Hui Chen.

STATEMENT REGARDING FEDERALLY SPONSORED RESEARCH OR DEVELOPMENT

The inventions disclosed herein were made the U.S. Government support pursuant to NRO Contract No. NRO000-07-C-0123 and DARPA Contract No. W31P4Q-08-C-0198. Accordingly, the Government may have certain rights in the inventions disclosed and claimed herein.

BACKGROUND

Electro-optic devices, and especially poled hyperpolarizable organic chromophore-based electro-optic devices have typically been limited to using cladding materials that are either characterized by relatively high resistivity or by large optical losses.

SUMMARY

According to an embodiment, an intrinsically low resistivity hybrid organic-inorganic material may be prepared by mixing a sol-gel solution including a first sol-gel precursor including at least three hydrolysable groups, a second sol-gel precursor including at least two hydrolysable groups and an organic cross-linking group, a third sol-gel precursor including a trap element bound to at least two hydrolysable groups, and a fourth sol-gel precursor serving as an electron donor or electron acceptor bound to at least two hydrolysable groups and wherein at least one of the third and fourth sol-gel precursors includes at least three hydrolysable groups.

According to an embodiment the first two sol-gel precursors may be mixed and hydrolyzed/condensed together in a Part A, the third and fourth sol-gel precursors may be mixed and hydrolyzed/condensed together in a Part B, and Parts A and B may then be combined.

According to an embodiment, the first two sol-gel precursors may include silicon. According to an embodiment, the third sol-gel precursor may include tin as the trap element. According to an embodiment, the fourth sol-gel precursor may include (in combination with a third sol-gel precursor including tin in its 4+ oxidation state) an electron donor substantially consisting of antimony in a 3+ oxidation state. According to another embodiment, the fourth sol-gel precursor may include (in combination with a third sol-gel precursor including tin in its 2+ oxidation state) an electron acceptor substantially consisting of antimony in a 5+ oxidation state. According to another embodiment, the fourth sol-gel precursor may include (in combination with a third sol-gel precursor including tin in its 2+ oxidation state) an electron acceptor substantially consisting of indium in a 3+ oxidation state.

According to an embodiment, the mixture may be gelled and cross-linked to produce a hybrid polymer including both organic cross-links and an oxide cross-linked network, and the gel dried and cured to form a film. According to an embodiment, the film may form a hybrid organic-inorganic polymer optical cladding having relatively low electrical resistivity arising from jumping conduction between covalently-bound trap elements.

According to an embodiment, an electro-optic device such as an electro-optic modulator may include a hybrid organic-inorganic optical cladding synthesized according to a sol-gel process and containing an electron trap element and an electron donor element. The electron trap element may include tin in a 4+ oxidation state and the electron donor element may be antimony in a 3+ oxidation state.

According to an embodiment, an electro-optic device such as an electro-optic modulator may include a hybrid organic-inorganic sol-gel optical cladding synthesized according to a sol-gel process and containing a hole trap element and an electron acceptor element. The hole trap element may include tin in a 2+ oxidation state and the electron acceptor element may include antimony in a 5+ oxidation state.

BRIEF DESCRIPTION OF THE FIGURES

FIG. 10 is a diagram illustrating several steps of fabrication of a device, according to an embodiment.

DETAILED DESCRIPTION

Figure 1:
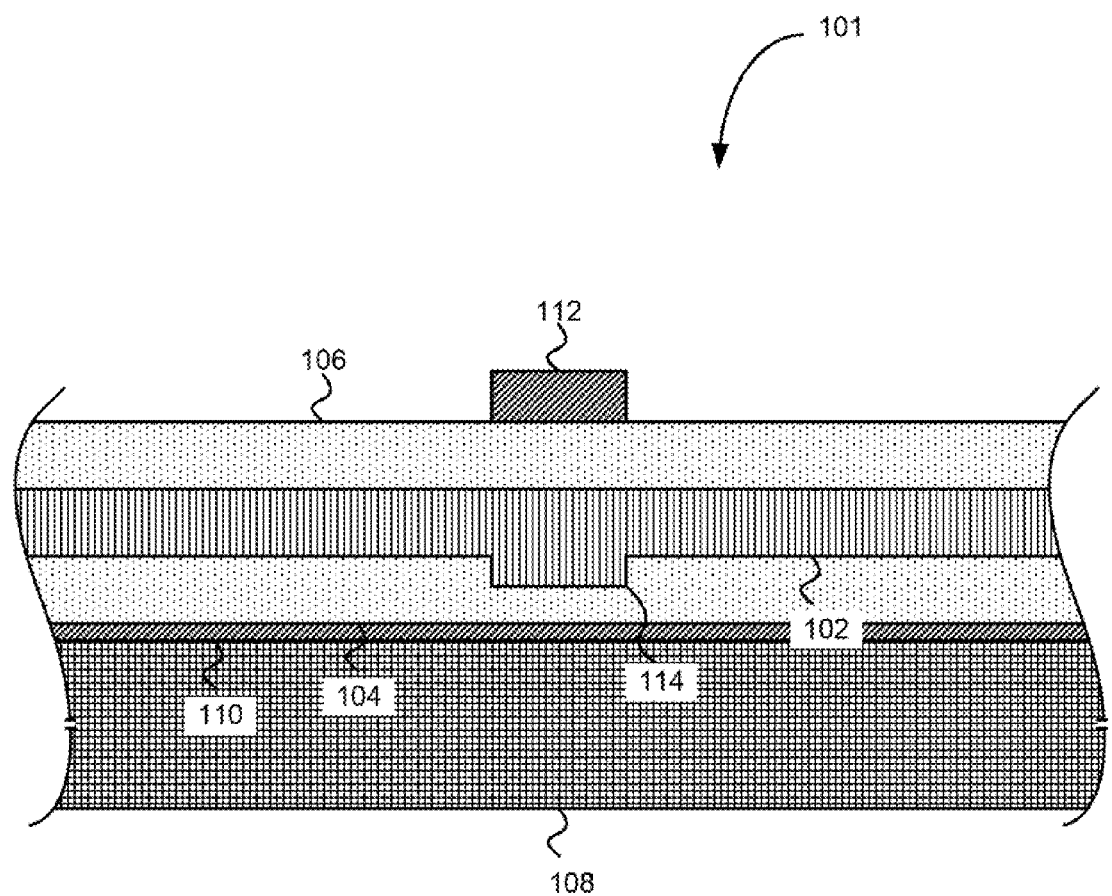
FIG. 1 is a cross-sectional diagram of an electro-optic device, according to an embodiment.

In the following detailed description, reference is made to the accompanying drawings, which form a part hereof. In the drawings, similar symbols typically identify similar components, unless context dictates otherwise. Other embodiments may be used and/or and other changes may be made without departing from the spirit or scope of the disclosure.

FIG. 1 is a cross-sectional diagram of an electro-optic device 101, according to an embodiment. The electro-optic device 101 includes an electro-optic core 102 disposed between optical clads 104 and 106. The electro-optic device 101 may be formed over a substrate 108 such as silicon, silicon-on-insulator, glass, or other semiconducting or insulating wafer. Two electrodes 110, 112 are arranged to apply a modulation voltage across the electro-optic core 102 through the clads 104, 106. One or more light guiding structures 114, such as a trench waveguide (illustrated), ridge waveguide, side clads, etc. may be provided to guide light transmitted through the electro-optic core 102 for modulation.

The electro-optic core may include at least one type of poled hyperpolarizable organic chromophore and polymer. For example, the polymer may be or include a linear polymer. The at least one hyperpolarizable organic chromophore and the polymer may form a guest-host material. Alternatively, the hyperpolarizable organic chromophore may be covalently bonded to the host polymer or may be otherwise trapped in the polymer. The host polymer may include an organic polymer, such as amorphous polycarbonate for example, or may include a hybrid material such as a sol-gel crosslinked network.

Typically, the electro-optic core material is poled, ideally to substantially align the chromophores. The core may be poled by applying a poling voltage from a poling electrode (not shown in FIG. 1) across the electro-optic core 102 through some or all of the cladding 106, 104 thickness while the device 101 is heated to near a glass transition temperature, $T_g$, of the polymer in the core. After the chromophores are aligned, the device 101 is cooled to "lock" the chromophores into their poled orientations. The poling electrode 116 may include a temporary electrode that is removed after poling. Alternatively, a modulation electrode 112 may be used as a poling electrode 116.

According to embodiments, the intrinsic electrical resistivity of the material in at least one of the optical clads 104, 106 is about an order of magnitude lower than the resistivity of the material in the electro-optic core 102. The reduced electrical resistivity of the optical cladding layers 104, 106 may be leveraged to reduce poling voltage and/or increase poling efficiency, decrease modulation voltage, allow thicker cladding (for example, to reduce optical loss), decrease device length, and/or provide deeper light modulation.

Figure 2:
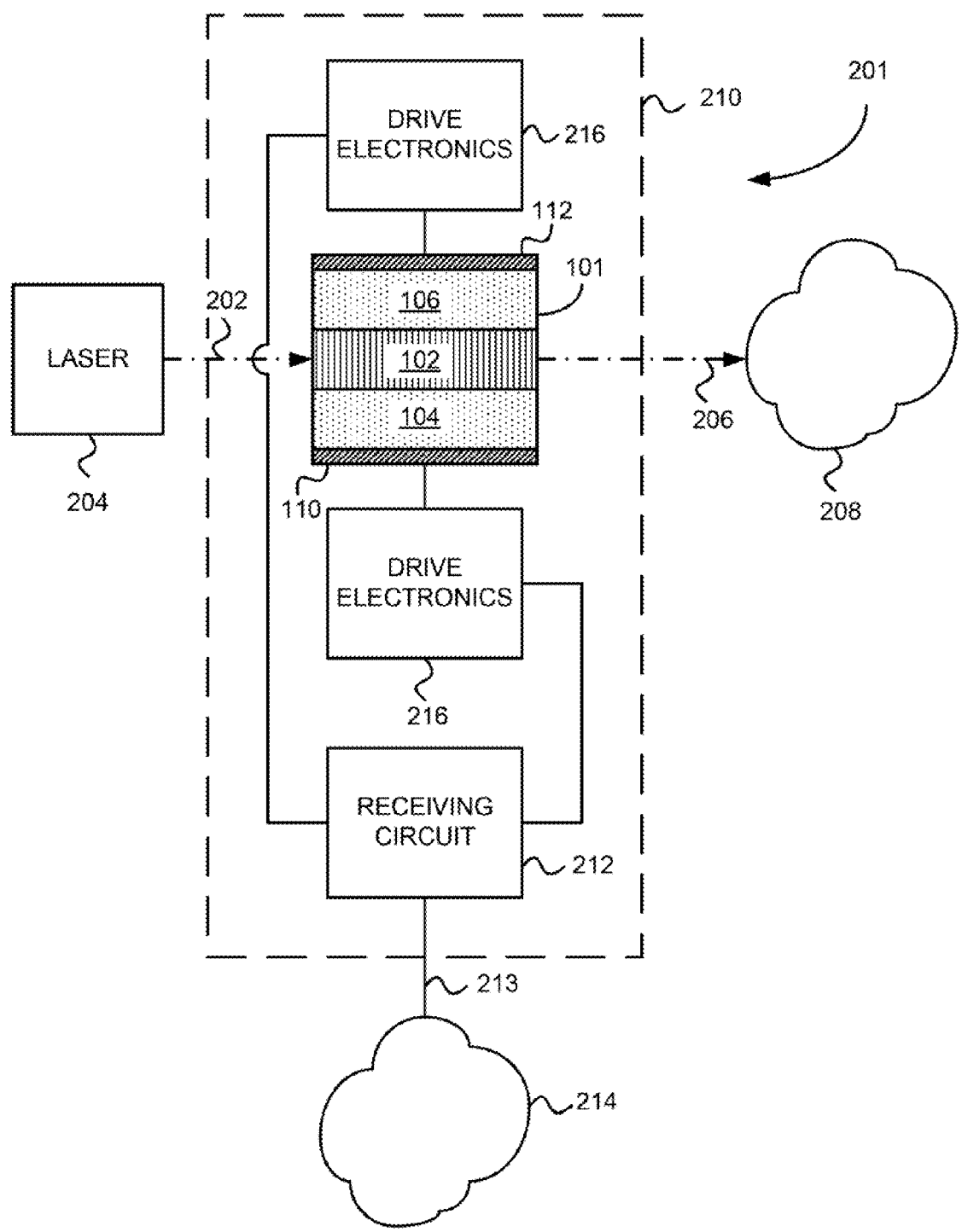
FIG. 2 is a simplified diagram of system including an electro-optic device of FIG. 1, according to an embodiment.

FIG. 2 is a simplified diagram of system 201 including an electro-optic device 101, according to an embodiment. In operation, light 202 such as laser light from a laser 204 at an infrared wavelength may be passed through the electro-optic core 102. To provide light guidance and minimize optical losses, the optical clads 104, 106 typically have indices of refraction that are lower than the index of refraction of the electro-optic core 102. For example, according to an embodiment, the nominal index of refraction of the electro-optic core 102 may be about 1.7 and the index of refraction of the clads 104, 106 may be about 1.45 to 1.47.

During operation, one electrode 110 may be held at ground while the other electrode 112 is voltage modulated. In some applications, the electrode 112 may be a top electrode that is provided in the form of a high speed strip electrode configured to propagate modulation pulses along its length, parallel to and preferably at least somewhat velocity-matched to the propagation of light through the electro-optic core 102. The poled hyperpolarizable chromophore in the electro-optic core 102 responds to the modulation voltage with a corresponding change in refractive index, which operates to modulate the phase of the propagated light 202. The device 101 may be used to provide a phase-modulated light signal 206 for transmission through other portions of a system, such as a network 208. Alternatively, the device 101, such as in a Mach-Zehnder modulator, may include plural optical channels in which, when the light is combined, the modulated light may destructively or constructively interfere to provide an amplitude-modulated light signal 206 for transmission.

According to embodiments, the electro-optic device 101 may be combined with other components in an integrated device 210. Such components may include a receiving circuit 212 configured to receive one or more signals along an input signal transmission path 213 from a network 214 or other signal source, and drive electronics 216 configured to provide the drive signal to the electrodes 110, 112.

It may be desirable to minimize the light propagation path length L along the electro-optic core 102. For example, shorter cores may provide lower propagation loss and/or reduce device real estate, and hence cost. It may also be desirable to minimize drive voltage applied to the electrodes 110, 112. For example, lower drive voltage may be easier to produce at very high frequencies typical of optical data transmission, may lend itself to higher levels of device integration, and/or may make the device 101 responsive to lower RF field strength.

Because of the relatively high poling efficiency and/or the relatively low resistivity of the clads 104, 106, the modulation voltage may be decreased. For example the drive electronics 216 may drive the electrodes 110, 112 to provide an electrical drive pulse of about 0.9 to 1.1 volts through the clad 104, electro-optic core 102, and top clad 106. Moreover, the bottom clad 104, electro-optic core 102, and top clad 106 may be configured, through geometry and/or relative resistivity, to deliver more than about 50% of the drive voltage as voltage drop across the electro-optic core 102. According to some embodiments, the bottom clad 104, electro-optic core 102, and top clad 106 may be configured to deliver more than about 90% of the drive voltage as voltage drop across the electro-optic core 102.

Referring again to FIG. 1, the intrinsically low resistivity claddings 104, 106 may lend themselves to lower drive voltage, because relatively less of the voltage difference between the electrodes 110, 112 may be incurred in the claddings 104, 106, leaving a larger signal available to drive the electro-optic core 102. Also, intrinsically low resistivity claddings 104, 106 may allow more favorable poling conditions and results.

According to embodiments, the bottom clad 104 may be about 1-2 microns thick below the waveguide 114 and/or about 2-2.4 microns thick without the trench waveguide 114 or at locations not corresponding to a trench waveguide 114. The electro-optic core 102 may be about 3 microns thick including a trench waveguide 114 and/or about 2 microns thick without the trench waveguide 114 or at locations not corresponding to the trench waveguide 114. The top clad may be about 0.5 to 2.0 microns thick.

According to another embodiment, the thickness of the cladding layers may be increased. Because of the reduced resistivity, the thickness of the cladding layers 104, 106 may be increased without increasing modulation voltage compared to prior art cladding materials. Alternatively, the thickness of the cladding layers 104, 106 may be increased while decreasing modulation voltage, or may be increased while incurring less of an increase in modulation voltage compared to prior art cladding materials. For example, the bottom clad 104 may be about 2-3 microns thick below the waveguide 114 and/or about 3-3.4 microns thick without the trench waveguide 114 or at locations not corresponding to a trench waveguide 114. The electro-optic core may be about 3 microns thick including a trench waveguide 114 and/or about 2 microns thick without the trench waveguide 114 or at locations not corresponding to the trench waveguide 114. The top clad may be about 1.5 to 3.0 microns thick.

Referring again to FIG. 1, the intrinsically low resistivity material in the cladding layers 104, 106 includes a hybrid organic-inorganic polymer network prepared according to a sol-gel process. The hybrid organic-inorganic material may be referred to as an organic modified sol-gel material. The chemical structure of the organic modified sol-gel may be expressed as:

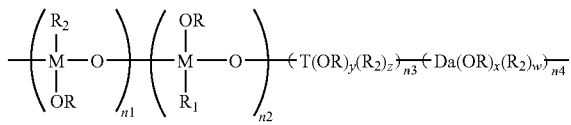

(1)

Wherein:
M=Si, Ti, Al, or Zr,
T=a trap element such as tin,
Da=a donor or acceptor element such as indium or antimony selected to undergo reversible oxidation/reduction with the trap element,
OR=independently at each occurrence, a hydrolysable group such as methoxy, ethoxy, propoxy, butoxy, etc.,
$R_1$=an organic cross-linker,
$R_2$=independently at each occurrence, a hydrolysable group or a spacer group such as an alkyl or aryl group,
X=2 or more
Y=2 or more, and at least one of X and Y is 3 or more
Z=the oxidation state of T, minus Y,
W=the oxidation state of Da, minus X, and
n1, n2, n3, n4 may be selected to balance optical, electrical, and physical properties of the cured sol-gel.

The $R_1$ group typically provides mechanical toughness to the cross-linked network. For example, a pure oxo-metallic network may exhibit relatively significant brittleness. According to embodiments, the organic cross-linking group $R_1$ may enable greater film thickness than materials not including the organic cross-linking group $R_1$.

According to embodiments, $R_1$ may be selected from among organic reactive groups capable of providing longer bond lengths and/or greater bond elasticity than oxo-metallic bonds. For example, $R_1$ may include a group such as an epoxy group or an acrylate group. For example, the epoxy group may be selected from a fluorinated epoxy group, an alkyl chain epoxy, an aryl-linked epoxy, and/or a multi-functional epoxy. For example, a glycidoxypropyl group has been used to advantage as $R_1$.

According to various embodiments, the number of hydrolysable groups bound to the trap sol-gel precursor and the electron donor/acceptor precursor may vary. It may be generally preferable that at least one of the trap and electron donor/acceptor sol-gel precursors includes at least three hydrolysable groups. According to another embodiment, each of the trap and the electron donor/acceptor sol-gel precursors includes at least three hydrolysable groups. Maintaining at least three hydrolysable groups may aid in the formation of a 3D network and improve mechanical, electrical, processing, and/or optical properties compared to use of sol-gel, trap, and donor/acceptor precursors possessing only two hydrolysable groups. Because precursors including two hydrolysable groups generally yield only linear polymerization following hydrolysis, including at least three hydrolysable groups on at least one or the other of the third and fourth sol-gel precursors may help in the formation of a 3D network of bonds.

For example, tin in its 4+ oxidation state can bind four hydrolysable groups, or three hydrolysable groups plus an organic group. According to an embodiment, $Sn^{4+}$ may be paired with antimony in its 3+ state, wherein $Sb^{3+}$ forms an electron donor to the $Sn^{4+}$. $Sb^{3+}$ can bind three hydrolysable groups or two hydrolysable groups plus an organic group. So the trap-donor pair $Sn^{4+}/Sb^{3+}$ can satisfy the preference for at least three hydrolysable groups bound to at least one of the precursors to form what may be referred to as an N-doped sol-gel phase (electron conductor).

According to another example, a sol-gel precursor including tin in its 2+ oxidation state may be paired with a sol-gel precursor including antimony in its 5+ oxidation state to form the trap-electron acceptor pair $Sn^{2+}/Sb^{5+}$. However $Sn^{2+}$ can only bind up to two hydrolysable groups, so one must look to antimony, $Sb^{5+}$ to provide the desired degree of 3D network cross-linking. $Sb^{5+}$ may bind up to five hydrolysable groups (or alternatively may bind 4 hydrolysable groups and one organic group, or 3 hydrolysable groups and 2 organic groups). Thus, for the example of $Sn^{2+}/Sb^{5+}$, tin does not include hydrolysable groups beyond those needed for linear polymerization, but antimony can include enough hydrolysable groups to support 3D network polymer formation. So the trap-acceptor pair $Sn^{2+}/Sb^{5+}$ can satisfy the preference for at least three hydrolysable groups bound to at least one of the precursors to form what may be referred to as a P-doped sol-gel phase (hole conductor).

According to another example, a sol-gel precursor including tin in its 2+ oxidation state may be paired with a sol-gel precursor including indium in its 4+ oxidation state to form the trap/electron acceptor pair $Sn^{2+}/In^{4+}$. As indicated above, $Sn^{2+}$ can only bind two hydrolysable groups, limiting it to linear polymerization. But, $In^{4+}$ may bind to up to four hydrolysable groups, thus satisfying the inclusion of at least three hydrolysable groups on at least one of the trap and donor/acceptor pair. Thus $Sn^{2+}/In^{4+}$ sol-gel precursors may be gelled to form what may be referred to as a P-doped sol-gel phase (hole conductor).

Other sol-gel precursors may similarly be combined to form intrinsically low resistivity hybrid organic-inorganic materials. Germanium, for example, is commercially available as a sol-gel precursor and may provide trap properties akin to those of tin.

For an embodiment where the trap element is tin and the donor or acceptor element is antimony, the structure of the sol-gel may be expressed as:

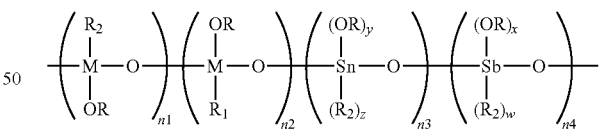

(2)

Wherein:
M=Si, Ti, Al, or Zr,
Sn=tin in its 4+ oxidation state or in its 2+ oxidation state,
Sb=antimony in its 3+ oxidation state or in its 5+ oxidation state,
OR=independently at each occurrence, a hydrolysable group such as methoxy, ethoxy, propoxy, butoxy, etc.,
$R_1$=an organic cross-linker such as an epoxy or acrylate,
$R_2$=a hydrolysable group or a spacer group such as an alkyl or aryl group,
X=0 or more,
Y=0 or more, and at least one of X and Y is 1 or more,
Z=the oxidation state of Sn, minus Y minus 2,
W=the oxidation state of Sb, minus X minus 2, and n1, n2, n3, n4 may be selected to balance optical, electrical, and physical properties of the cured hybrid organic-inorganic polymer network.

According to embodiments of the materials represented by formulas (1) and (2), n1 and n2 may be within about a factor of 5 of one another. According to an embodiment, n1 and n2 are within about a factor of 2 of each other. According to an embodiment, n1 and n2 may be about equal. According to an embodiment, the sum of n1 and n2 may be between about 2 and 10 times n3. According to an embodiment, the sum of n1 and n2 may be about 4 times n3. According to an embodiment, n4 may be smaller than n3. According to an embodiment, n3 may be between about 2 and 5 times n4. According to an embodiment, n3 may be about n4 times the number of hydrolysable groups in the Sb sol-gel precursor. According to another embodiment, n4 may be about n3 times the number of hydrolysable groups in the Sn sol-gel precursor. According to an embodiment, n1 is about 1.8, n2 is about 1.8, n3 is about 1, and n4 is about 0.33.

While the structures (1) and (2) are indicated, for simplicity, as including singly bound hydrolysable groups —OR (and optionally, —R$_2$), and singly bound organic cross-linker groups R$_1$, such groups may generally be converted respectively to inorganic and organic cross-links in solid films. The linkages between monomers may include M-O-M, M-O—Sn, Sn—O—Sb, and M-O—Sb inorganic linkages as shown above. Generically, these bonds may be referred to as oxo-metal bonds. A silicate bond (Si—O—Si) is an example of an oxo-metal bond where both metal atoms are silicon. The material also includes organic linkages. At least the majority of organic cross-linkages may typically be M-R$_1$—O-M, M-R$_1$—R$_1$-M, especially in embodiments where the sol-gel is prepared in two-parts (as described below). Structures such as M-R$_1$—O-M, M-R$_1$—R$_1$-M, M-R$_1$—Sn, and M-R$_1$—O—Sb may be referred to as organic cross-links.

The intrinsically low resistivity hybrid organic-inorganic polymer network structure shown above may be configured to conduct electrons or conduct holes. For example, for an embodiment including tin as the trap element and antimony +3 as a donor element, a hybrid organic-inorganic polymer network prepared according to a sol-gel process may be an electron conductor, the structure of which may be expressed as:

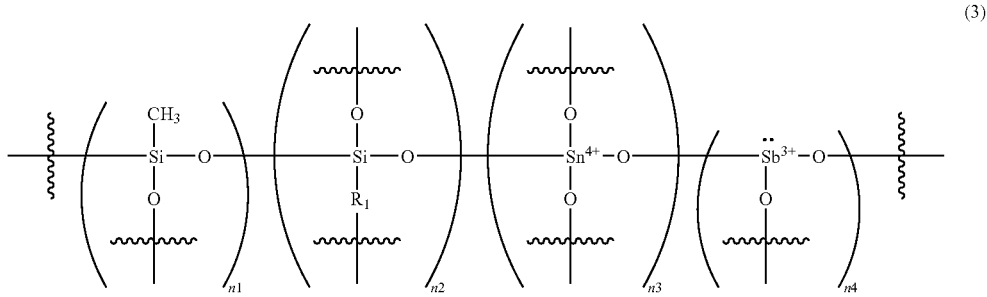

(3)

Wherein:

wavy lines represent cross-link bonds to other parts of the hybrid organic-inorganic polymer network, R$_1$=an organic cross-linker such as an epoxy or acrylate, and the two dots above the Sb$^{3+}$ atom indicate an electron pair in the outer orbital.

For example, according to an embodiment:
R$_1$=a glycidoxypropyl (epoxy) organic cross-linker,
n1=1.8,
n2=1.8,
n3=1, and
n4=0.33.

According to another illustrative example for an embodiment including tin as the trap element and antimony 5+ as an acceptor element, the hybrid organic-inorganic polymer network may be a hole conductor, and the structure of the hybrid organic-inorganic polymer network may be expressed as:

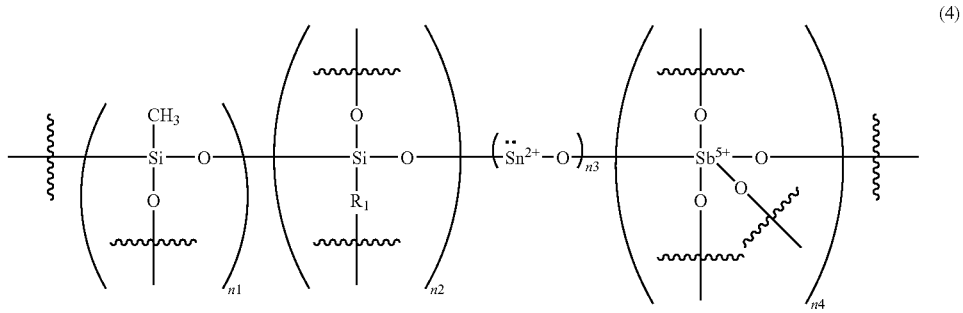

(4)

Wherein:

wavy lines represent cross-link bonds to other parts of the hybrid organic-inorganic polymer network, R$_1$=an organic cross-linker such as an epoxy or acrylate, and the two dots above the Sn$^{2+}$ atom indicate an electron pair in the outer orbital.

The R$_1$ cross linker may include an epoxy, such as:

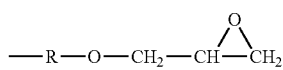
(5)

or an acrylate group, such as:

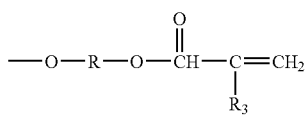
(6)

Wherein:

R is a linear or branched alkyl group (e.g., for a glycidoxypropyl group, R is —$CH_2$—$CH_2$—$CH_2$—);

$R_3$ is an organic spacer group such as an alkyl or aryl group. According to embodiments, $R_3$ may include one to about twenty carbon atoms.

The selection of electron or hole conductivity in structures (3) and (4) depends on the relative valences of the tin and antimony atoms. Antimony may be provided in a +3 oxidation state ($Sb^{3+}$) or in a +5 oxidation state ($Sb^{5+}$). Tin may be provided in a +2 oxidation state ($Sn^{2+}$) or in a +4 oxidation state ($Sn^{4+}$). Upon application of an electrical field, and optionally by raising the temperature of the material, current may flow through the material by electron or hole jumping between charge traps. Such current flow may arise according to a process akin to a phenomenon such as Poole-Frenkel emission.

For example, by pairing +4 tin ($Sn^{4+}$) with +3 antimony ($Sb^{3+}$), corresponding to structure (3) above, an electron pair from the antimony atom may be reversibly transferred to the tin atom (upon receiving sufficient thermal energy and/or being exposed to an electrical field) according to the reversible reaction:

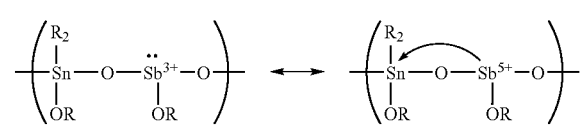
(7)

whereby the tin becomes conductive via jumping conduction through the hybrid organic-inorganic polymer network. The two dots above the $Sb^{3+}$ atom indicate an electron pair in the outer orbital, and the dotted arrow indicates a transfer of the electron pair from the outer orbital of the antimony atom to the tin atom.

The extra electron associated with the tin atom thus becomes available to jump between tin atoms within the hybrid organic-inorganic polymer network, resulting in a significant increase in electron mobility. The increase in electron mobility is expressed as reduced resistivity or increased conductivity of the hybrid organic-inorganic polymer network material.

Alternatively, by pairing +2 tin ($Sn^{2+}$) with antimony in its +5 oxidation state ($Sb^{5+}$) corresponding to structure (4) above, an electron pair from the tin atom may be reversibly transferred to the antimony atom (upon receiving sufficient thermal energy and/or being exposed to an electrical field) according to the reversible reaction:

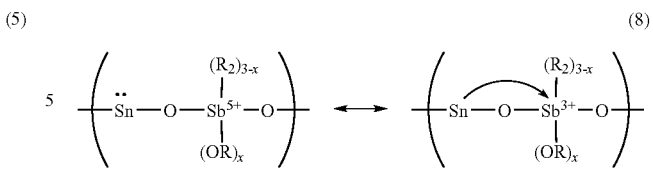
(8)

whereby the tin becomes conductive via jumping conduction through the hybrid organic-inorganic polymer network. The dotted arrow indicates a transfer of the electron pair from the tin atom to the antimony atom.

The missing electron pair (formerly) associated with the tin atom thus becomes a hole available to receive electrons jumping between tin atoms in the hybrid organic-inorganic polymer network, resulting in a significant increase in hole mobility. The increase in hole mobility is expressed as reduced resistivity or increased conductivity.

Figure 3:
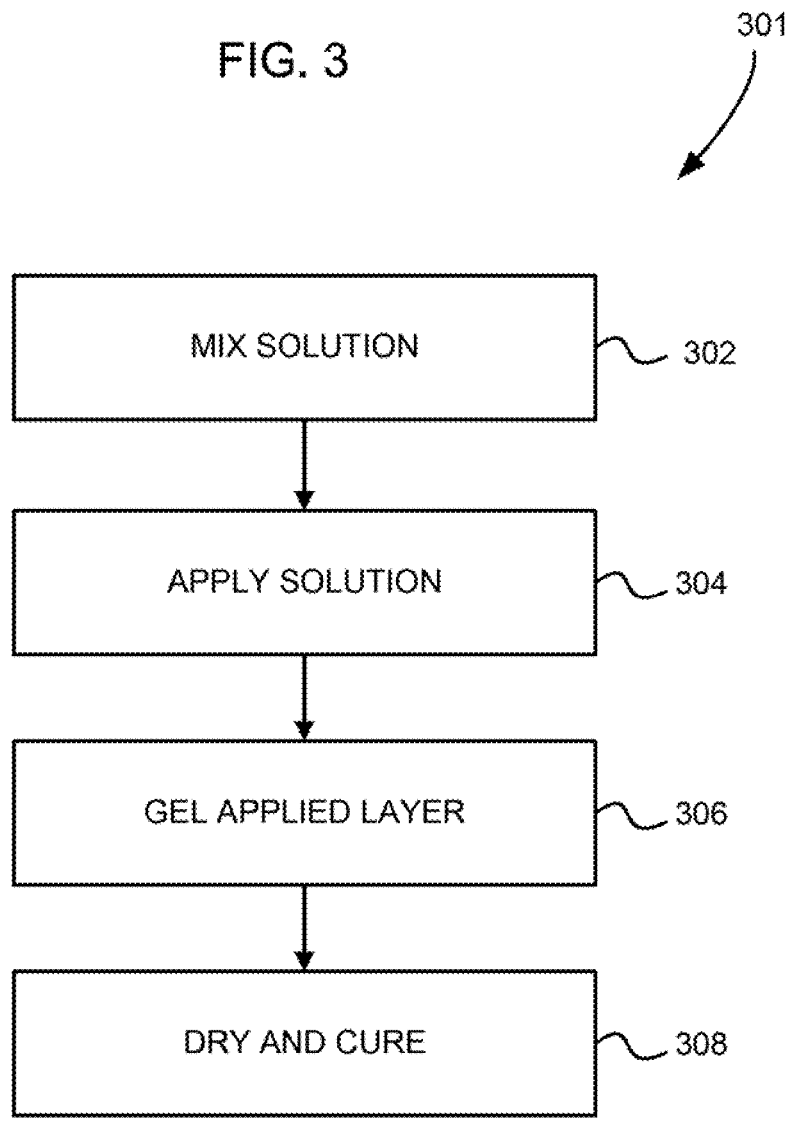
FIG. 3 is a flow chart showing a method for making an intrinsically low resistivity hybrid organic-inorganic polymer network prepared according to a sol-gel process, according to an embodiment.

FIG. 3 is a flow chart showing a method 301 for making an intrinsically low resistivity hybrid organic-inorganic polymer network prepared according to a sol-gel process forming an optical cladding according to an embodiment. In step 302, a sol-gel solution including tin and antimony sol-gel precursors is mixed. For example, the sol-gel solution may include a Part A containing a silicon sol-gel precursor and an organically-modified sol-gel precursor that includes an organic cross-linker. The preparation of Part A may be represented by:

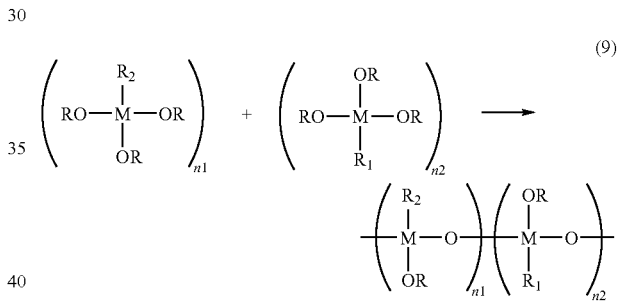
(9)

wherein:

M is, independently at each occurrence, Si, Ti, Al, or Zr,

OR is a hydrolysable group, $R_1$ is an organic cross-linker, $R_2$ is a hydrolysable group, an alkyl spacer group, or an aryl spacer group, and n1 and n2 are within a factor of 5 of one another. According to an embodiment, n1 and n2 are within about a factor of 2 of one another. According to an embodiment n1 and n2 are about equal.

The sol-gel solution may further include a Part B that contains a tin sol-gel precursor and an antimony sol-gel precursor. As described elsewhere herein, Part B may operate as an electron conductor including antimony +3. The preparation of an electron-conducting Part B may be represented by:

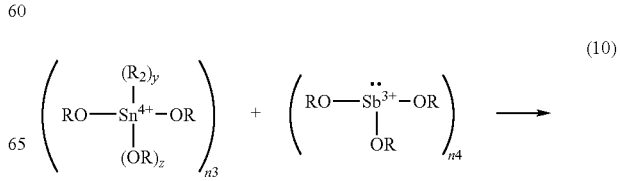
(10)

-continued

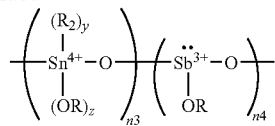

wherein:
the two dots above the $Sb^{3+}$ indicate an electron pair,
OR is a hydrolysable group,
$R_2$ is an alkyl spacer group or an aryl spacer group, and
z is 1 or 2, y is 2−z,
n3 is greater than n4. According to an embodiment, the ratio n3/n4 is about equal to 3.

As described elsewhere herein, Part B may alternatively include a hole conductor including antimony +5. The preparation of a hole-conducting Part B may be represented by:

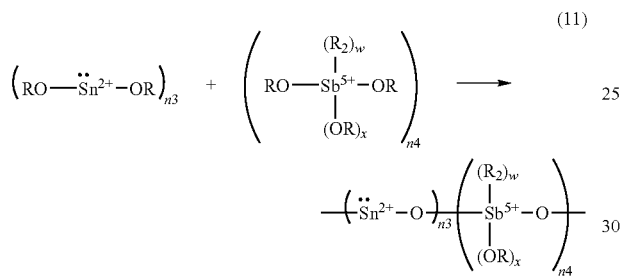

(11)

wherein:
OR is a hydrolysable group,
$R_2$ is an alkyl spacer group or an aryl spacer group,
x is 2 or 3,
w is 3−x, and
n3 is greater than n4. According to an embodiment, the ratio n3/n4 is about equal to x+2.

Larger numbers of hydrolysable groups (fewer $R_2$ groups) generally provides greater cross-linking to the rest of the hybrid organic-inorganic polymer network. For embodiments where Part B is mixed and forms a precursor solution prior to adding Part A, and where n3>n4, this may result in better electronic coupling between antimony and tin atoms, because stoichiometry suggests that the antimony hydrolysable groups may tend to primarily link to tin monomers. According to an embodiment, the ratio n3/n4 may be about equal to the number of hydrolysable groups in the Sb sol-gel precursor.

As may be seen, tin and antimony 3+ (products of reaction 10) and tin and antimony 5+ (products of reaction 11) are covalently bound via oxo-metal bonds. Typically, the other hydrolysable groups OR, shown for simplicity in the formulas, may also be hydrolysed and replaced by oxo-metal bonds after mixing with Part A.

Parts A and B may then be combined to form a hybrid organic-inorganic polymer network prepared according to a sol-gel process including organic and inorganic cross-links and interspersed tin electron or hole traps configured to conduct current through electron jumping between tin atoms.

Specific embodiments may be made by reference to the following examples:

EXAMPLE 1

Part A

1) Dropped 32.10 g (0.18 mole) of methyltriethoxysilane (from Gelest, double distilled) into 34.00 g of n-butanol in a 250-mL round bottom flask equipped with stirring bar.
2) Dropped 42.48 g (0.18 mole) of 3-glycidoxypropyltrimethoxysilane (from Gelest, double distilled).
3) Dropped 17.64 g of $H_2O$ and the solution becomes cloudy.
4) Dropped 1.80 g of 2M HCl. The solution becomes clear after stirring for a few minutes.
5) Inserted the round bottom flask in an 80° C. oil bath and equip with condenser for 4 hours.

EXAMPLE 2

Part B

6) Added 41.10 g (0.10 mole) of tetra-t-butoxytin (from Gelest) slowly into 30.00 g of acetylacetone in a 100-mL round bottom flask equipped with stirring bar. The round bottom flask immersed an ice bath. The dissolving process is exothermic. The solution temperature was maintained <40° C. About 30 minutes later, all solid was dissolved and the solution temperature was around room temperature or slightly lower.
7) Dropped 11.36 g (0.033 mole) antimony III n-butoxide into the above tin precursor solution slowly with magnetic stirring. Continued stirring at room temperature for another 12 hours and the bottle neck was capped with septum. The final solution was light orange.

EXAMPLE 3

Combining of Parts A and B

8) Solution B was added into solution A through a 0.25 μm filter drop wise with magnetic stirring on at the same time at room temperature. It took around 30 minutes to finish the addition. Then cap the solution A flask with septum and kept stirring at room temperature overnight. The final solution was light orange color. Its solid content is around 37 wt % and it is suitable for 2-3 μm film spin process. For thinner film deposition, it can be diluted by solvent such as n-butanol.

Proceeding to step 304, the solution is applied to a surface. For example, the solution may be spin-coated, dipped, or sprayed onto a substrate such as a silicon, glass, or silicon-on-insulator wafer. The substrate may include one or a plurality of bottom electrodes (FIG. 1, 110).

Next, in step 306, the applied layer is cured thermally or via an ultraviolet and thermal process. Molecular structures for illustrative cured materials are represented by formulas provided above. There are two types of gelling or crosslinking mechanisms. One is from the inorganic backbone and the other is from the organic components. Detailed crosslinking mechanisms may be seen in U.S. Pat. No. 7,206,490, incorporated by reference herein.

Proceeding to step 308, the gelled material is further condensed and cured to form a solid film, which in turn forms the optical cladding.

Referring back to FIG. 1, the material in optical clads 104, 106 may be referred to as intrinsically low resistivity because the electron or hole conduction is provided by atoms that are covalently bound within the sol-gel matrix. Alternatively or additionally, conduction may be provided by guest dopants such as salts in the matrix that may migrate through the material under the influence of an external electrostatic field. Such dopants are described in U.S. patent application Ser. No. 12/559,727; filed Sep. 15, 2009; entitled "ELECTRO-OPTIC DEVICE AND METHOD FOR MAKING LOW RESISTIVITY HYBRID POLYMER CLADS FOR AN ELECTRO-OPTIC DEVICE"; invented by Danliang Jin, Guomin Yu, Anna Barklund, Hui Chen and Raluca Dinu; and to the extent not inconsistent with this application, incorporated by reference herein.

According to an embodiment, an intrinsically low resistivity hybrid organic-inorganic polymer network prepared according to a sol-gel process may further be doped with a salt such as lithium perchlorate.

Figure 4:
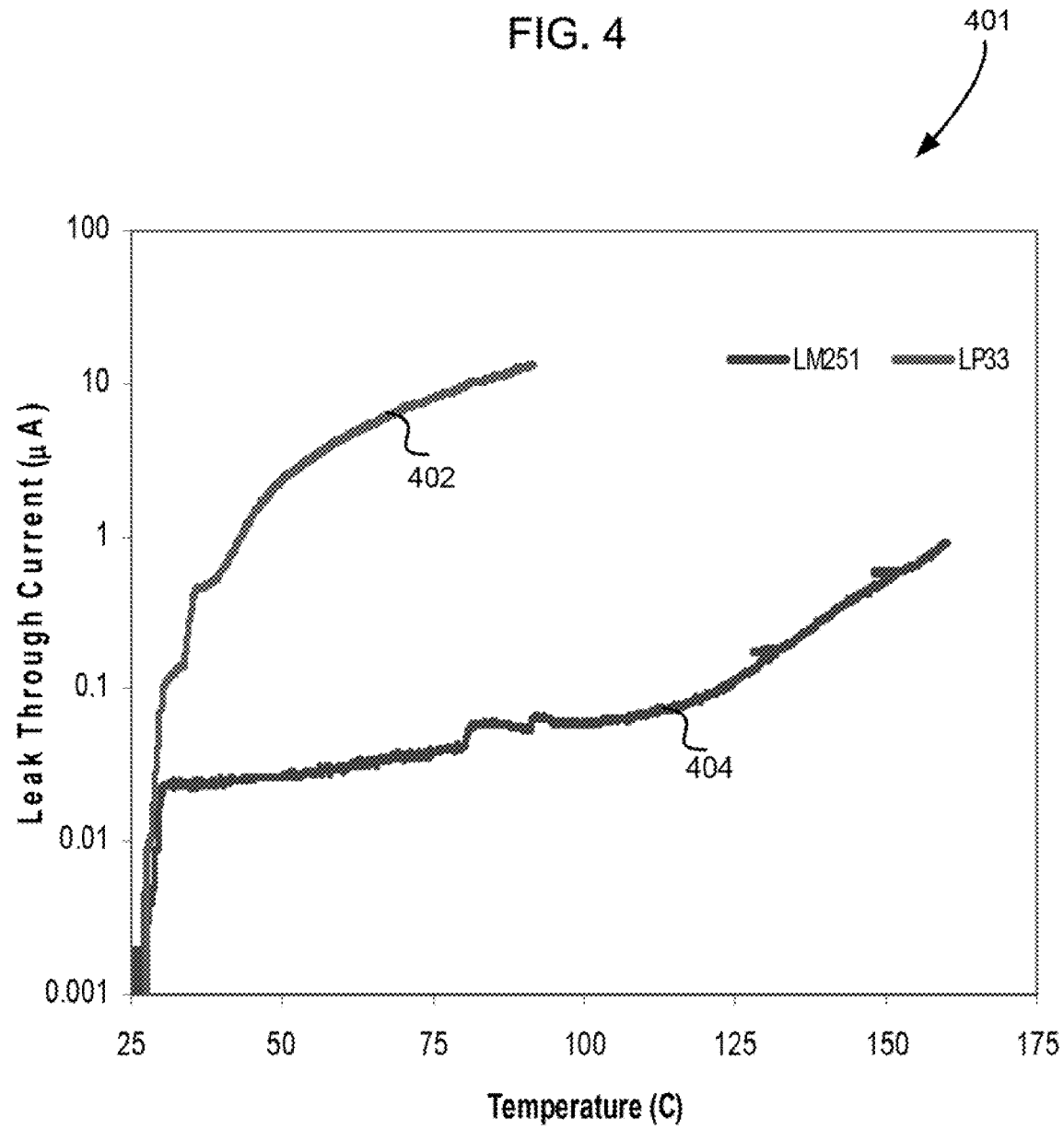
FIG. 4 is a graph showing an effect of decreased resistivity of a lithium perchlorate doped hybrid organic-inorganic polymer network prepared according sol-gel process compared to a conventional UV cured cladding material.

FIG. 4 is a graph 401 showing the (relatively less persistent) effect of decreased resistivity on a lithium perchlorate doped hybrid organic-inorganic polymer network prepared according to a sol-gel process (LP33) 402 vs. a conventional UV cured acrylate polymer cladding material (LM251) 404 as exhibited by leak-through current at elevated temperatures that may be encountered before and during poling. The curve 402 for the doped material is truncated below typical poling temperatures because of the high amount of leak-through current that was encountered during the experiment, but the effect of reduced resistivity may still be clearly seen.

Low resistivity in a hybrid organic-inorganic polymer network clad may provide benefits during poling to reduce poling voltage and/or increase poling efficiency. Additionally or alternatively, low resistivity in a hybrid organic-inorganic polymer network clad may provide benefits during operation to reduce operating voltage, increase modulation depth, decrease device size, and/or increase cladding thickness. Compared to doped materials, the decrease in resistivity exhibited by the intrinsic materials described herein may provide increased persistence.

Figure 5:
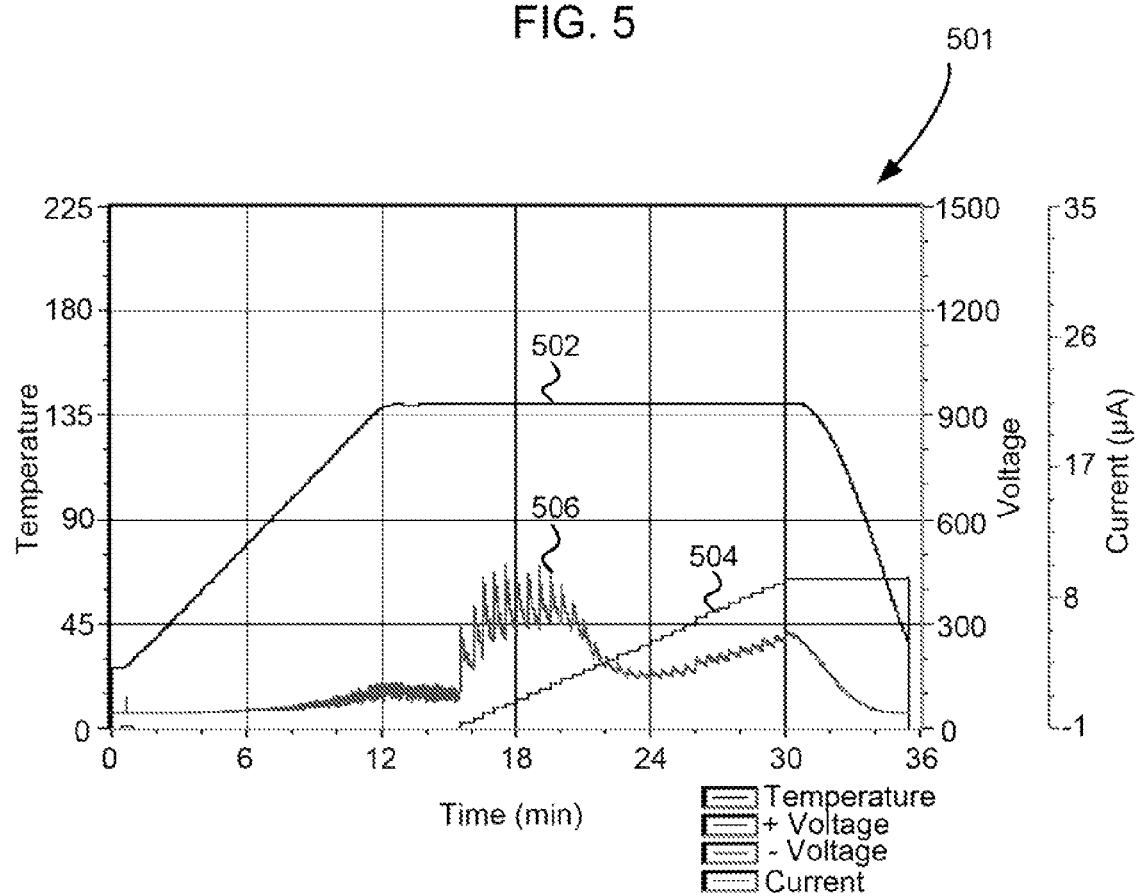
FIG. 5 is a graph showing relatively low persistence of a doped non-intrinsically conducting hybrid organic-inorganic polymer network prepared according to a sol-gel process.

FIG. 5 is a graph 501 showing relatively low persistence of electrical conductivity in a doped (non-intrinsically) conducting hybrid organic-inorganic polymer network prepared according to a sol-gel process. Time is shown on the horizontal axis. Curve 502 shows temperature vs. time indexed against ° C. shown on the left vertical axis. Curve 504 shows voltage vs. time indexed against volts shown on the first right vertical axis. Curve 506 shows leak-through current vs. time indexed against micro-volts shown on the second right vertical axis. As may be seen, the leak-through current decreased after about 20 minutes, despite a continuing increase in voltage. This is attributed to exhaustion of the guest dopant after it physically migrated through the film.

Figure 6:
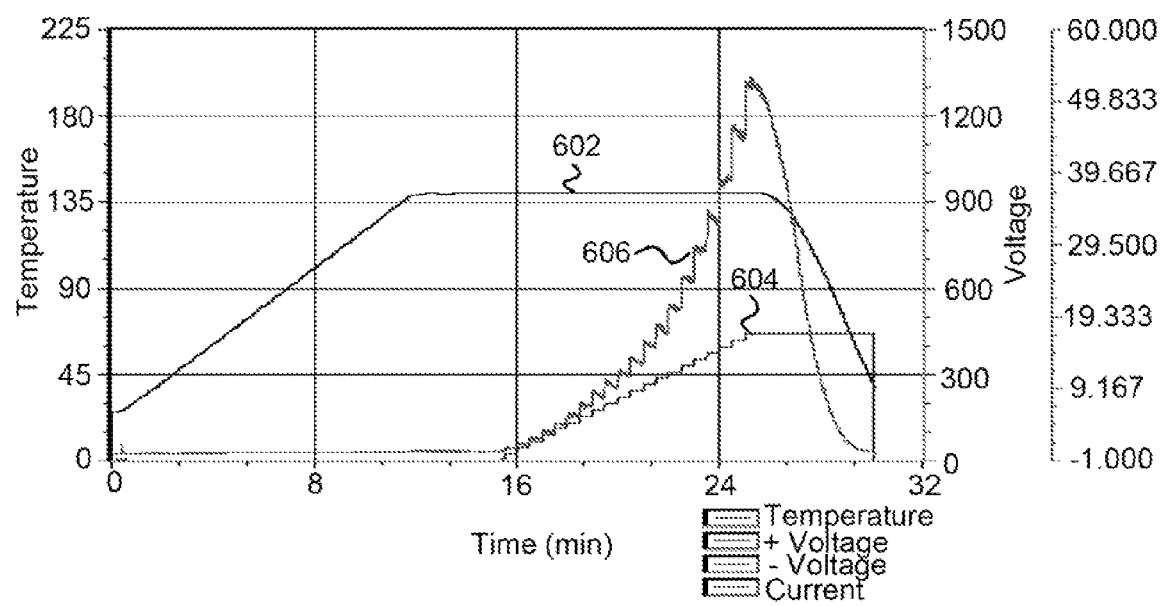
FIG. 6 is a graph showing relatively high persistence of electrical conductivity in an intrinsically low resistivity hybrid organic-inorganic polymer network prepared according to a sol-gel process, made according to an embodiment.

FIG. 6 is a graph 601 showing relatively high persistence of electrical conductivity in an intrinsically low resistivity hybrid organic-inorganic polymer network prepared according to a sol-gel process, made according to an embodiment. Time is shown on the horizontal axis. Curve 602 shows temperature vs. time indexed against ° C. shown on the left vertical axis. Curve 604 shows voltage vs. time indexed against volts shown on the first right vertical axis. Curve 606 shows leak-through current vs. time indexed against micro-volts shown on the second right vertical axis. As may be seen, the leak-through current 606 continued to increase with increasing voltage 604 substantially until the temperature 602 was decreased. Compared to the leak-through current curve 506 (FIG. 5) for the doped material, the leak-through current curve 606 for the intrinsically low resistivity material exhibited improved persistence, indicating that the conduction mechanism substantially did not involve or result in physical migration of a dopant through the film.

Figure 7:
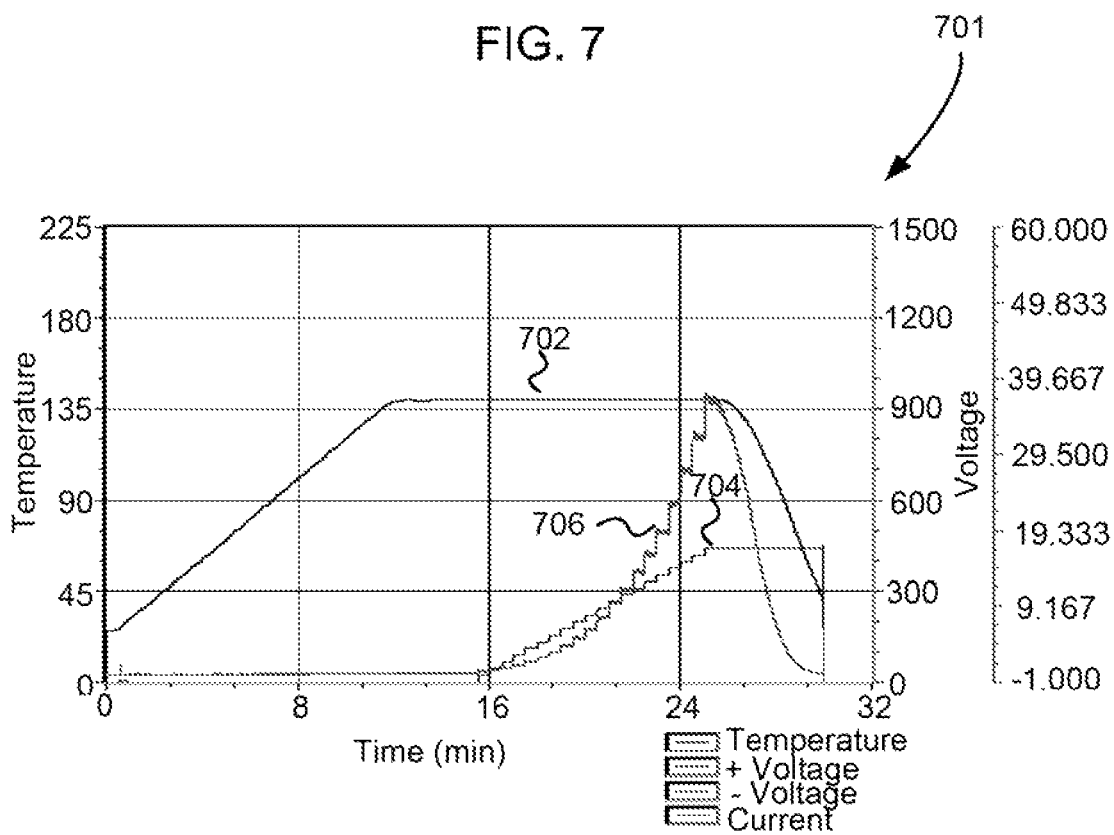
FIG. 7 is a graph showing continued persistence of electrical conductivity in an intrinsically low resistivity hybrid organic-inorganic polymer network prepared according to a sol-gel process, made according to an embodiment.

FIG. 7 is a graph 701 showing continued persistence of electrical conductivity in an intrinsically low resistivity hybrid organic-inorganic polymer network prepared according to a sol-gel process during a second run of the same sample shown in FIG. 6, according to an embodiment. Time is again shown on the horizontal axis. Curve 702 shows temperature vs. time indexed against ° C. shown on the left vertical axis. Curve 704 shows voltage vs. time indexed against volts shown on the first right vertical axis. Curve 706 shows leak-through current vs. time indexed against micro-volts shown on the second right vertical axis. As may be seen, the leak-through current 706 again continued to increase with increasing voltage 704 substantially until the temperature 702 was decreased. Compared to the leak-through current curve 606 (FIG. 6) for the first run, the leak-through current curve 706 for the intrinsically low resistivity material was somewhat reduced but was only reduced by about 20%. It is believed that this reduction may be related to the contribution of other mobile species to the leak-through current 606 of FIG. 6. However, the major conductive contribution of the intrinsic mechanisms described herein was still substantially intact.

Figure 8:
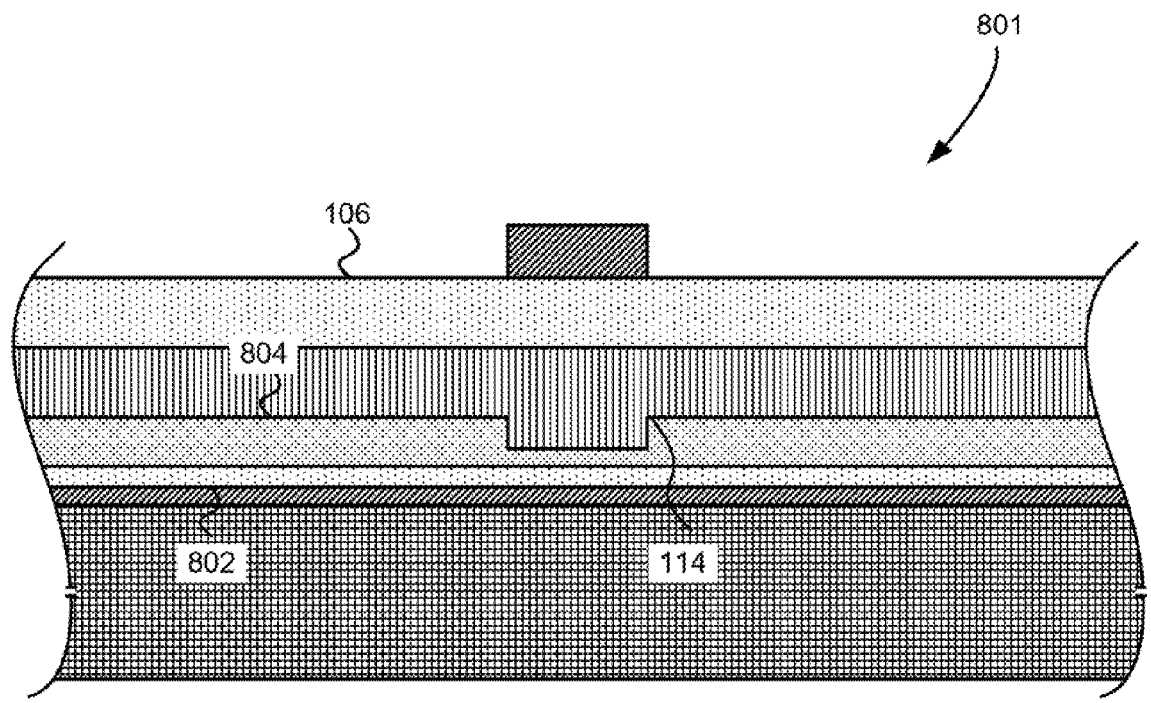
FIG. 8 is a cross-sectional diagram of an alternative device structure, according to an embodiment.

FIG. 8 is a cross-sectional diagram of an alternative device structure 801, according to an embodiment. In some embodiments, it may be advantageous to combine the intrinsically low resistivity hybrid organic-inorganic polymer cladding layers with one or more other cladding layers formed from more conventional materials. For example, a bottom cladding layer may include a first cladding layer 802 made with an hybrid organic-inorganic polymer network prepared according to a sol-gel process as described herein. The bottom cladding may also include another cladding layer 804. For example, the additional cladding layer 804 may include a relatively high resistivity material such as a UV-cured polymer, a cross-linked polymer, or another conventional cladding material. The upper cladding layer 106 may be formed from an intrinsically low resistivity hybrid organic-inorganic polymer network prepared according to a sol-gel process as described above.

One attribute of the device structure 801 may be that the etching process used to form the waveguide structure 114 may be performed on an alternative material. In some embodiments, etching an alternative material may be advantageous for process considerations.

Figure 9:
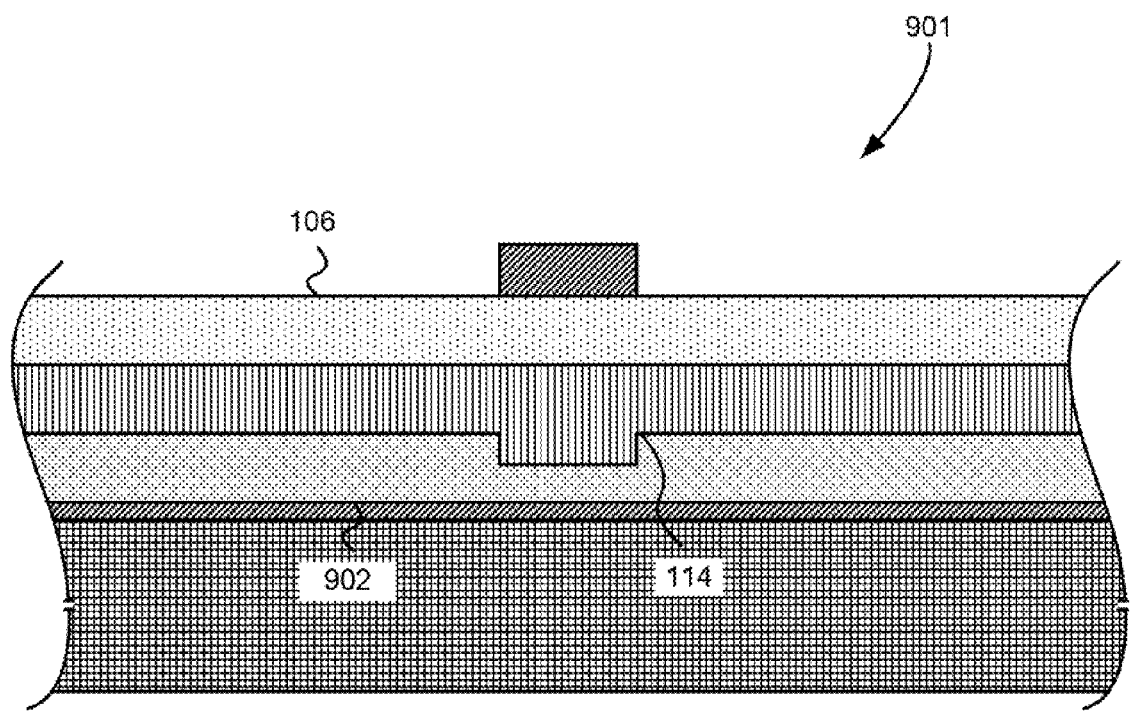
FIG. 9 is a cross-sectional diagram of another alternative device structure, according to an embodiment.

FIG. 9 is a cross-sectional diagram of another alternative device structure 901, according to an embodiment. In the embodiment of FIG. 9, the bottom cladding layer 104 is substituted with another type of cladding 902. The device 901 uses a bottom clad 902 with dry-etched trench waveguide 114 formed from UV15LV, a conventional ultraviolet-cured cross-linked polymer. The top-cladding 106 is formed from an intrinsically low resistivity hybrid organic-inorganic polymer network prepared according to a sol-gel process as taught herein.

FIG. 10 is a diagram 1001 illustrating a device 101 at several steps of fabrication 1002 to 1012, according to an embodiment. First, as shown at step 1002, a bottom cladding layer 104 is deposited over a substrate 108 and bottom electrode 110. The bottom cladding layer may be a monolithic intrinsically conductive hybrid organic-inorganic polymer network prepared according to a sol-gel process as described herein. Alternatively, a bottom cladding layer may be formed as a composite with a first cladding layer 802 made with an intrinsically low resistivity hybrid organic-inorganic polymer network prepared according sol-gel process as described herein and another cladding layer 804. For example, the additional cladding layer 804 may include a relatively high resistivity material such as a UV-cured polymer, a cross-linked polymer, or another conventional cladding material.

The bottom cladding layer 104 may be deposited as an intrinsically low resistivity sol-gel solution, as described above. For example, the bottom cladding layer may be deposited by spraying or spin-coating. Then, the bottom cladding may be dried and cured to form a solid film. For example, the wafer may be kept at about 100° C. to 200° C. for a period of time sufficient to provide the desired mechanical properties. For example, the temperature may be maintained for between 30 minutes and 10 hours. There has not been any detrimental effect found arising from 10 hours or longer dry and cure times.

In step 1004, a waveguide structure 114 may be formed in the bottom clad 104. Generally, the waveguide structure 114 is formed parallel and below a top electrode. Etching may be performed by a number of methods. For example, plasma etching such as reactive ion etching or deep reactive ion etching may be used to form a trench waveguide 114, and may be advantageous for forming smooth and vertical trench sides.

Proceeding to step 1006, a core material 102 including hyperpolarizable (aka non-linear) chromophores is deposited over the bottom cladding 104, for example by spin-coating or spraying. If the core material includes a polymer material such as an amorphous polycarbonate, the core 102 may be applied from solution during spinning or spraying, and then baked at elevated temperature to remove the solvent. Optionally, the core material may be reheated to reflow the top surface of the core 102 flat. If the core material includes a hybrid organic-inorganic material, the core may be dried and cured similar to the method described in conjunction with step 1004 above. Generally, it is preferable not to include an intrinsically low resistivity component in the hybrid material when it is used as a material for the core 102.

Proceeding to step 1008, a top cladding 106 is applied over the electro-optic material layer 102. Preparation, application, drying, and curing of the intrinsically low resistivity hybrid organic-inorganic polymer network prepared according to a sol-gel process may be done as described above. Alternatively, the top cladding 106 may include another material such as a UV-cured polymer, UV-cured fluorinated sol-gel materials, a cross-linked polymer, a non-fluorinated sol-gel, or another conventional cladding material.

Proceeding to step 1010, a poling electrode 116 may be formed over the upper cladding layer 106, and the electro-optic core 102 poled to align the chromophores as described above. The top electrode 112/116 shown in FIG. 1 may be configured as a modulation electrode and/or as a poling electrode. In some embodiments, such as that illustrated by FIG. 10, the poling electrode 116 may be removed after poling and a high speed electrode formed.

During step 1010, the poling electrode 116 may be formed, for example by sputtering or solution plating over the top cladding 106. During poling, the core material 102 is brought up to near its glass transition temperature. Generally, it may be preferable for the temperature to be within ±10 C of the glass transition temperature of the cross-linking core polymer. The elevated temperature makes it easier for the polar chromophore molecules to rotate to a parallel orientation responsive to the applied poling voltage.

Then, a poling circuit applies a poling voltage to the poling electrode and maintains the bottom electrode 110 at ground. The poling voltage may be a relatively low poling voltage of about 500 volts or may be up to about 900 to 1000 volts, depending on the device configuration and the total thickness between the poling electrodes. Typically, the poling voltage is maintained for about less than one to three minutes while the temperature is maintained, then the temperature is allowed to drop. The poling voltage is removed, typically shortly after the temperature reaches room temperature. The reduction in temperature causes the core polymer to drop below its glass transition temperature, which tends to immobilize the chromophores in the poled orientation.

According to alternative embodiments, the modulation electrode 112 may be used as a poling electrode 116. This is more feasible using the materials described herein because of the high efficiency of poling. However, the process 1001 shows a more conventional approach where separate poling 116 and modulation 112 electrodes are used.

Proceeding to step 1012, the poling electrode 116 is stripped off the top of the top cladding 106. Optionally, an additional thickness of top cladding material may be deposited over the stripped top cladding 106. Then, a modulation electrode 112 is formed. The modulation electrode 112 is typically configured as a high speed (aka RF) strip electrode configured to conduct modulation signals at very high modulation bandwidths corresponding to optical signal transmission bandwidths. Typically, trace and electrode layouts take propagation delay and signal termination into account to maximize the transmission of in-phase, clean signals while minimizing reflections, impedance, and other deleterious effects.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An electro-optic device, comprising:
   an electro-optic core; and
   abutting or proximate the electro-optic core, at least one optical cladding formed as an intrinsically low resistivity hybrid organic-inorganic polymer network,
   wherein the at least one intrinsically low resistivity hybrid organic-inorganic polymer network optical cladding includes:
   a network of at least one positive oxidation state element covalently bound by oxo-metal bonds and organic cross-links; and
   a trap element covalently bound to the network and configured to conduct electricity by jumping conduction.

2. The electro-optic device of claim 1, wherein the at least one positive oxidation state element includes silicon, and wherein the oxo-metal bonds include silicate bonds.

3. The electro-optic device of claim 1, wherein the organic cross-links include at least one of an epoxy or an acrylate cross-linked group.

4. The electro-optic device of claim 1, wherein the trap element includes tin.

5. The electro-optic device of claim 1, wherein the tin is covalently bound to the network by at least one selected from the group consisting of oxo-metal bonds and organic cross-links.

6. The electro-optic device of claim 1, wherein the optical cladding includes antimony covalently bound to at least the tin by at least oxo-metal bonds.

7. An electro-optic device, comprising:
   an electro-optic core; and
   abutting or proximate the electro-optic core, at least one optical cladding formed as an intrinsically low resistivity hybrid organic-inorganic polymer network, wherein the at least one intrinsically low resistivity hybrid organic-inorganic polymer network optical cladding is prepared according to a sol-gel process; and includes:

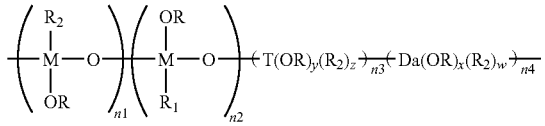

wherein:
M is Si, Ti, Al, or Zr,
T is a trap element,
Da is a donor or acceptor element selected to undergo reversible oxidation/reduction with the trap element,
OR is independently at each occurrence, a hydrolysable group,
$R_1$ is an organic cross-linker,
$R_2$ is independently at each occurrence, a hydrolysable group, an alkyl group, or an aryl group,
x is 0 or more,
y is 0 or more, and at least one of x and y is 1 or more,
z is the oxidation state of T, minus y,
w is the oxidation state of Da, minus x,
n1 and n2 are within about a factor of 5 of one another,
the sum of n1 and n2 is between about 2 times and 10 times n3, and
the ratio of n3/n4 is about equal to x.

8. The electro-optic device of claim 7, wherein $R_1$ is:

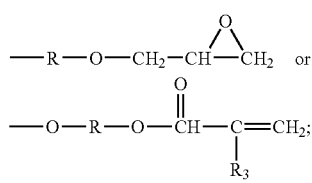

wherein:
R is a linear or branched alkyl group; and
$R_3$ is an alkyl or aryl group.

9. An electro-optic device, comprising:
an electro-optic core; and
abutting or proximate the electro-optic core, at least one optical cladding formed as an intrinsically low resistivity hybrid organic-inorganic polymer network, wherein the at least one intrinsically low resistivity hybrid organic-inorganic polymer optical cladding includes:

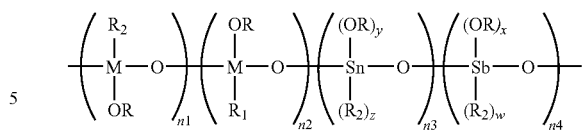

wherein:
M is Si, Ti, Al, or Zr,
Sn is tin in its 4+ oxidation state or in its 2+ oxidation state,
Sb is antimony in its 3+ oxidation state if tin is in its 4+ oxidation state or antimony in its 5+ oxidation state if tin is in its 2+ oxidation state,
OR is, independently at each occurrence, a hydrolysable group,
$R_1$ is an organic cross-linker,
$R_2$ is independently at each occurrence, a hydrolysable group, an alkyl group, or an aryl group,
x is 0 or more,
y is 0 or more, and at least one of x and y is 1 or more,
z is the oxidation state of Sn, minus y minus 2,
w is the oxidation state of Sb, minus x minus 2,
n1 and n2 are within about a factor of 5 of one another,
the sum of n1 and n2 is between about 2 times and 10 times n3, and
the ratio of n3/n4 is about equal to (x+2).

10. The electro-optic device of claim 9, wherein Sb is $Sb^{3+}$, x is 1 and w is zero.

11. The electro-optic device of claim 9, wherein Sb is $Sb^{5+}$, x is 1 to 3 and w is (3-x).

12. The electro-optic device of claim 9, wherein $R_1$ is:

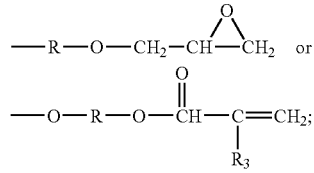

wherein:
R is a linear or branched alkyl group; and
$R_3$ is an alkyl or aryl group.

13. The electro-optic device of claim 9, wherein the intrinsically low resistivity hybrid organic-inorganic polymer network is made using a sol-gel process.

14. An electro-optic device, comprising:
an electro-optic core; and
abutting or proximate the electro-optic core, at least one optical cladding formed as an intrinsically low resistivity hybrid organic-inorganic polymer network, wherein the at least one intrinsically low resistivity hybrid organic-inorganic polymer network optical cladding includes:

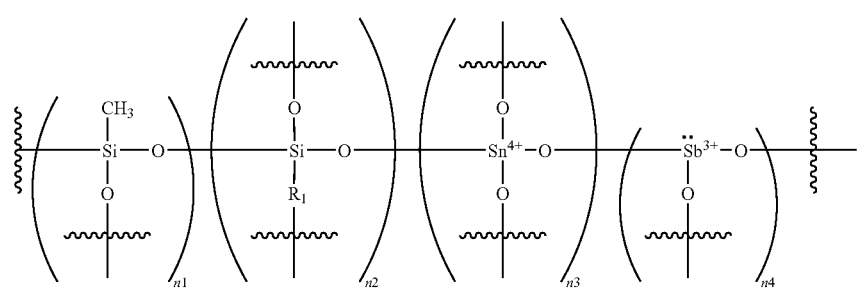

wherein:
wavy lines are organic cross-link bonds or oxo-metal bonds to other parts of the hybrid organic-inorganic polymer network, $R_1$ is an organic cross-linker, —, and —O— are bonds to other parts of the hybrid organic-inorganic polymer network;

the two dots above the $Sb^{3+}$ atom indicate an electron pair in the outer orbital, n1 and n2 are within about a factor of 5 of one another, the dotted arrow indicates a transfer of the electron pair from the outer orbital of the antimony atom to the tin atom.

18. An electro-optic device, comprising:
an electro-optic core; and
abutting or proximate the electro-optic core, at least one optical cladding formed as an intrinsically low resistivity hybrid organic-inorganic polymer network, wherein the at least one intrinsically low resistivity hybrid organic-inorganic optical cladding includes:

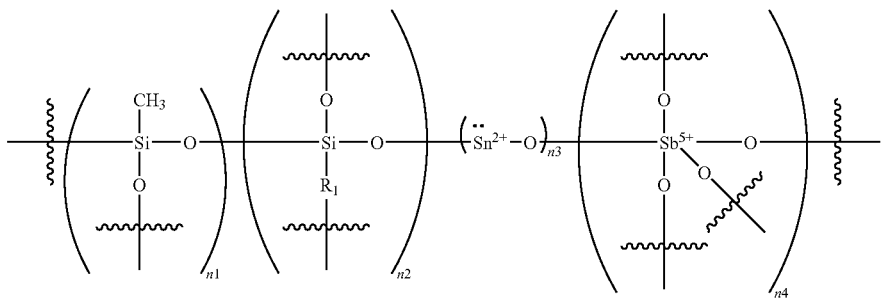

the sum of n1 and n2 is between about 2 times and 10 times n3, and n4 is smaller than n3.

15. The electro-optic device of claim 14, wherein $R_1$ is:

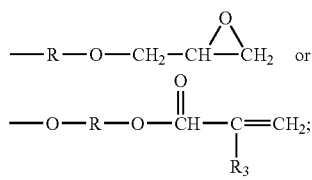

wherein:
R is a linear or branched alkyl group; and
$R_3$ is an alkyl or aryl group.

16. The electro-optic device of claim 14, wherein:
n1 is about 1.8,
n2 is about 1.8,
n3 is about 1, and
n4 is about 0.33.

17. The electro-optic device of claim 14, wherein the tin and antimony groups are configured to undergo the reaction:

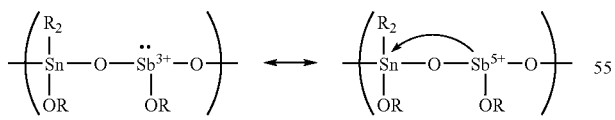

whereby the tin becomes conductive via jumping conduction; and wherein:
—, —O—, and —OR are bonds to other parts of the hybrid organic-inorganic polymer network;
$R_2$ is an organic spacer group or a bond to other parts of the hybrid organic-inorganic polymer network
the two dots above the $Sb^{3+}$ atom indicate an electron pair in the outer orbital, and wherein:
wavy lines are organic cross-link bonds or oxo-metal bonds to other parts of the hybrid organic-inorganic polymer network, $R_1$ is an organic cross-linker, the two dots above the $Sn^{2+}$ atom indicate an electron pair in the outer orbital, n1 and n2 are within about a factor of 5 of one another, the sum of n1 and n2 is between about 2 times and 10 times n3, and n4 is smaller than n3.

19. The electro-optic device of claim 18, wherein $R_1$ is:

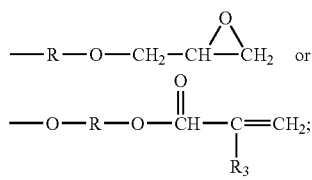

wherein:
R is a linear or branched alkyl group; and
$R_3$ is an alkyl or aryl group.

20. The electro-optic device of claim 18, wherein:
n1 is about 1.8,
n2 is about 1.8,
n3 is about 1, and
n4 is about 0.20.

21. The electro-optic device of claim 18, wherein the tin and antimony groups are configured to undergo the reaction:

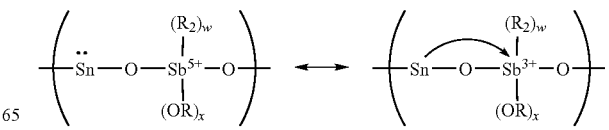

whereby the tin becomes conductive via jumping conduction; and wherein:

the two dots above the Sn atom indicate an electron pair in the outer orbital, $R_2$ is an organic spacer group, x is 1 or more, w is (3-x); and the dotted arrow indicates a transfer of the electron pair from the tin atom to the antimony atom.

22. The electro-optic device of claim 1, wherein the electro-optic core includes at least one hyperpolarizable organic chromophore and a cross-linked polymer.

23. The electro-optic device of claim 22, wherein the at least one hyperpolarizable organic chromophore and the polymer form a guest-host material.

24. The electro-optic device of claim 1, wherein the at least one optical cladding includes a bottom clad and a top clad, the bottom and top clads formed as an intrinsically low resistivity hybrid organic-inorganic polymer network prepared according to a sol-gel process, and wherein the electro-optic core is disposed between the bottom and top clads.

25. The electro-optic device of claim 24, further comprising at least one organic polymer clad disposed over or under at least one of the bottom or top hybrid clads.

26. The electro-optic device of claim 24, further comprising:

a substrate;

a bottom electrode disposed on the substrate;

wherein the bottom clad, electro-optic core, and top clad are disposed over the bottom electrode; and a top electrode disposed over the top clad.

27. The electro-optic device of claim 26, further comprising a waveguide structure disposed parallel to the top electrode.

28. The electro-optic device of claim 26, wherein at least one of the top and bottom electrodes is configured as a high speed strip electrode.

29. The electro-optic device of claim 26, wherein the top and bottom electrodes are configured to provide an electrical drive pulse of about 0.9 to 1.1 volts through the bottom clad, electro-optic core, and top clad.

30. The electro-optic device of claim 26, wherein the top electrode is configured as a poling electrode.

31. The electro-optic device of claim 24, wherein:

the bottom clad is about 1-2.0 microns thick;

the electro-optic core is about 3 microns thick at a trench waveguide; and the top clad is about 0.5 to 2.0 microns thick.

32. The electro-optic device of claim 24 wherein:

the bottom clad is about 2-2.4 microns thick;

the electro-optic core is about 3 microns thick; and the top clad is about 0.5 to 2.0 microns thick.

33. The electro-optic device of claim 1, wherein the intrinsically low resistivity hybrid organic-inorganic polymer network includes a covalently bound trap element and a covalently bound electron donor or electron receiver element.

34. A method for making an electro-optic device, comprising:

making an intrinsically low resistivity hybrid organic-inorganic material by:

combining with a first sol-gel precursor including at least three hydrolysable groups;

a second sol-gel precursor including at least two hydrolysable groups and an organic cross-linking group;

a third sol-gel precursor including a trap element bound to at least two hydrolysable groups; and a fourth sol-gel precursor including an electron donor or acceptor element bound to at least two hydrolysable groups;

to form:

a network of at least one positive oxidation state element covalently bound by oxo-metal bonds and organic cross-links; and a trap element covalently bound to the network and configured to conduct electricity by jumping conduction;

wherein at least one of the third and fourth sol-gel precursors includes at least three hydrolysable groups;

depositing the intrinsically low resistivity hybrid organic-inorganic material as at least one optical cladding; and forming an electro-optic core abutting or proximate to the at least one optical cladding.

35. The method for making an intrinsically low resistivity hybrid organic-inorganic material of claim 34, wherein:

the first sol-gel precursor and the second sol-gel precursor are mixed and hydrolysed in a part A;

the third sol-gel precursor and the fourth sol-gel precursor are mixed and hydrolysed in a part B; and the parts A and B are then be combined.

36. The method for making an intrinsically low resistivity hybrid organic-inorganic material of claim 34, wherein the first sol-gel precursor and the second sol-gel precursor include silicon.

37. The method for making an intrinsically low resistivity hybrid organic-inorganic material of claim 34, wherein the organic cross-linking group of the second sol-gel precursor includes an epoxy or an acrylate.

38. The method for making an intrinsically low resistivity hybrid organic-inorganic material of claim 37, wherein the organic cross-linking group includes a glycidoxypropyl group.

39. The method for making an intrinsically low resistivity hybrid organic-inorganic material of claim 34, wherein the trap element is tin.

40. The method for making an intrinsically low resistivity hybrid organic-inorganic material of claim 34, wherein:

the fourth sol-gel precursor includes an electron donor.

41. The method for making an intrinsically low resistivity hybrid organic-inorganic material of claim 40, wherein:

the fourth sol-gel precursor includes antimony or indium.

42. The method for making an intrinsically low resistivity hybrid organic-inorganic material of claim 34, wherein:

the fourth sol-gel precursor includes an electron acceptor including antimony in a 5+ oxidation state.

43. The method for making an intrinsically low resistivity hybrid organic-inorganic material of claim 34, further comprising:

gelling and organically cross-linking the mixture; and drying and curing the gel to form a film.

44. The method for making an intrinsically low resistivity hybrid organic-inorganic material of claim 43, wherein:

the film forms a hybrid organic-inorganic polymer material having relatively low electrical resistivity arising from jumping conduction between instances of the covalently-bound trap element.

45. The method for making an intrinsically low resistivity hybrid organic-inorganic material of claim 44, wherein:

the covalently bound trap element includes tin.

46. The method for making an intrinsically low resistivity hybrid organic-inorganic material of claim 45, wherein:

at least a portion of the tin is configured to receive excess electrons from the electron donor element upon at least one of being thermally energized or being exposed to an electric field.

47. The method for making an intrinsically low resistivity hybrid organic-inorganic material of claim 45, wherein:
at least a portion of the tin is configured to donate electrons to the electron acceptor element upon at least one of being thermally energized or being exposed to an electric field.

48. The method for making an intrinsically low resistivity hybrid organic-inorganic material of claim 34, wherein:
the first sol-gel precursor and the second sol-gel precursor are combined and hydrolysed in a part A according to the reaction:

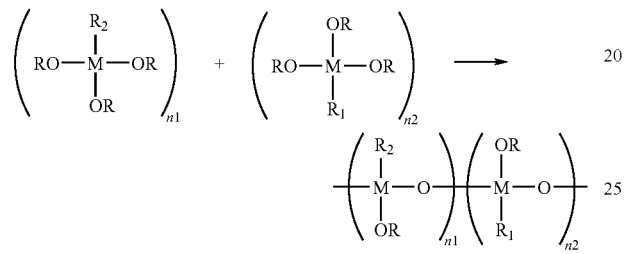

wherein:
M is, independently at each occurrence, Si, Ti, Al, or Zr;
OR is a hydrolysable group;
$R_1$ is an organic cross-linker;
$R_2$ is a hydrolysable group, an alkyl spacer group, or an aryl spacer group; and
n1 and n2 are within a factor of 5 of one another;
wherein the third and fourth sol-gel precursors are combined in a Part B; and
wherein Part A is then combined with Part B to form the intrinsically low resistivity hybrid organic-inorganic material.

49. The method for making an intrinsically low resistivity hybrid organic-inorganic material of claim 48, wherein n1 and n2 are within about a factor of 2 of one another.

50. The method for making an intrinsically low resistivity hybrid organic-inorganic material of claim 34, wherein:
the first and second sol-gel precursors are combined in a Part A;
wherein the third sol-gel precursor and the fourth sol-gel precursor are mixed and hydrolysed in a part B according to the reaction:

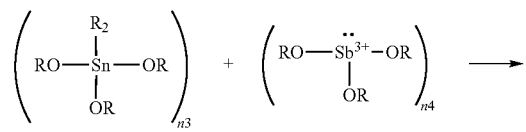

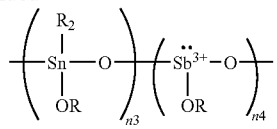

wherein:
the two dots above the $Sb^{3+}$ indicate an electron pair,
OR is a hydrolysable group,
$R_2$ is a hydrolysable group, an alkyl spacer group, or an aryl spacer group, and
n3 is greater than n4; and
wherein Part A is then combined with Part B to form the intrinsically low resistivity hybrid organic-inorganic material.

51. The method for making an intrinsically low resistivity hybrid organic-inorganic material of claim 48, wherein the ratio n3/n4 is about equal to 3.

52. The method for making an intrinsically low resistivity hybrid organic-inorganic material of claim 34, wherein:
the first and second sol-gel precursors are combined in a Part A;
wherein the third sol-gel precursor and the fourth sol-gel precursor are mixed and hydrolysed in a part B according to the reaction:

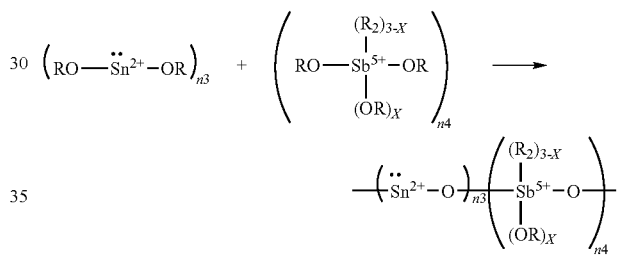

wherein:
OR is a hydrolysable group,
$R_2$ is a hydrolysable group, an alkyl spacer group, or an aryl spacer group, x is between 1 and 3,
n3 is greater than n4; and
wherein Part A is then combined with Part B to form the intrinsically low resistivity hybrid organic-inorganic material.

53. The method for making an intrinsically low resistivity hybrid organic-inorganic material of claim 48, wherein the ratio n3/n4 is equal to about x+2.

54. The method for making an intrinsically low resistivity hybrid organic-inorganic material of claim 34, further comprising:
gelling and organically cross-linking the mixture; and
drying and curing the gel to form an optical cladding.

55. The method for making an intrinsically low resistivity hybrid organic-inorganic material of claim 34, further comprising:
combining with the first, second, third and fourth sol-gel precursors, an inorganic salt dopant configured to temporarily further reduce the resistivity of the material.

* * * * *